July 5, 1960 F. M. O. FOERSTER 2,944,213
APPARATUS FOR NON-DESTRUCTIVE TESTING
Filed Nov. 15, 1954 4 Sheets-Sheet 1
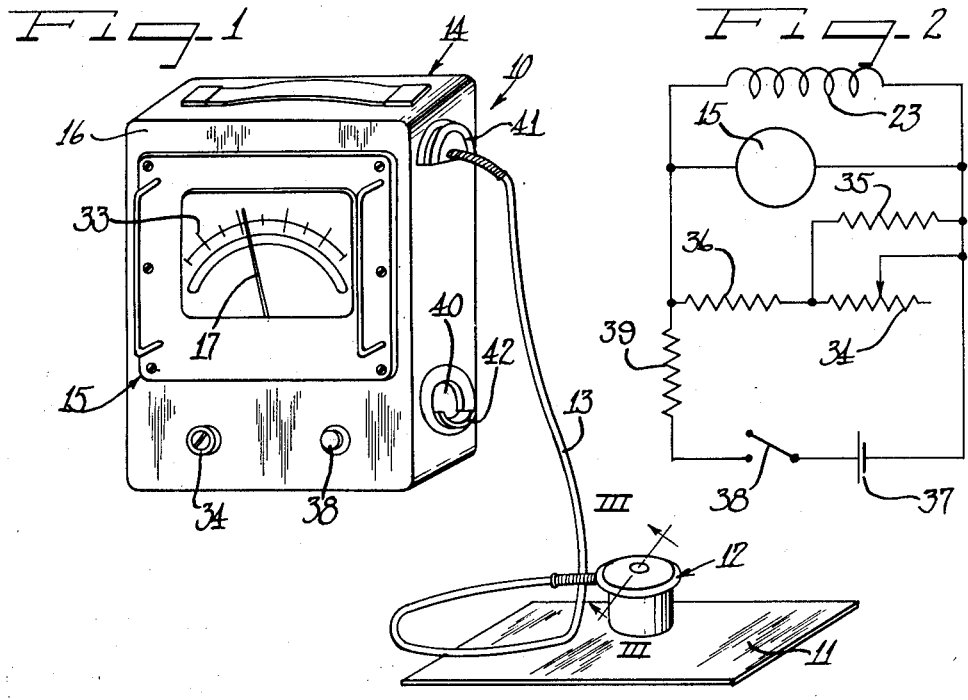
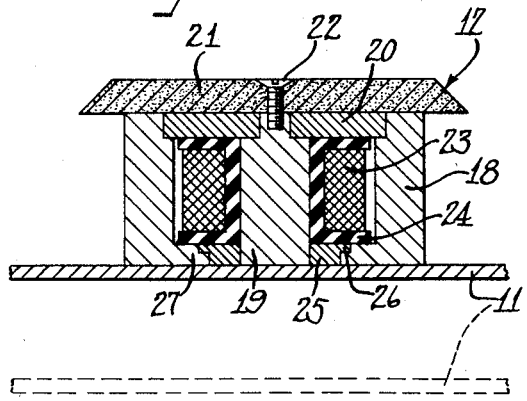
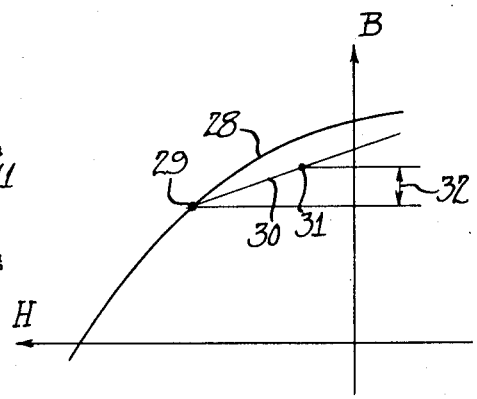
Inventor
Friedrich M. O. Foerster

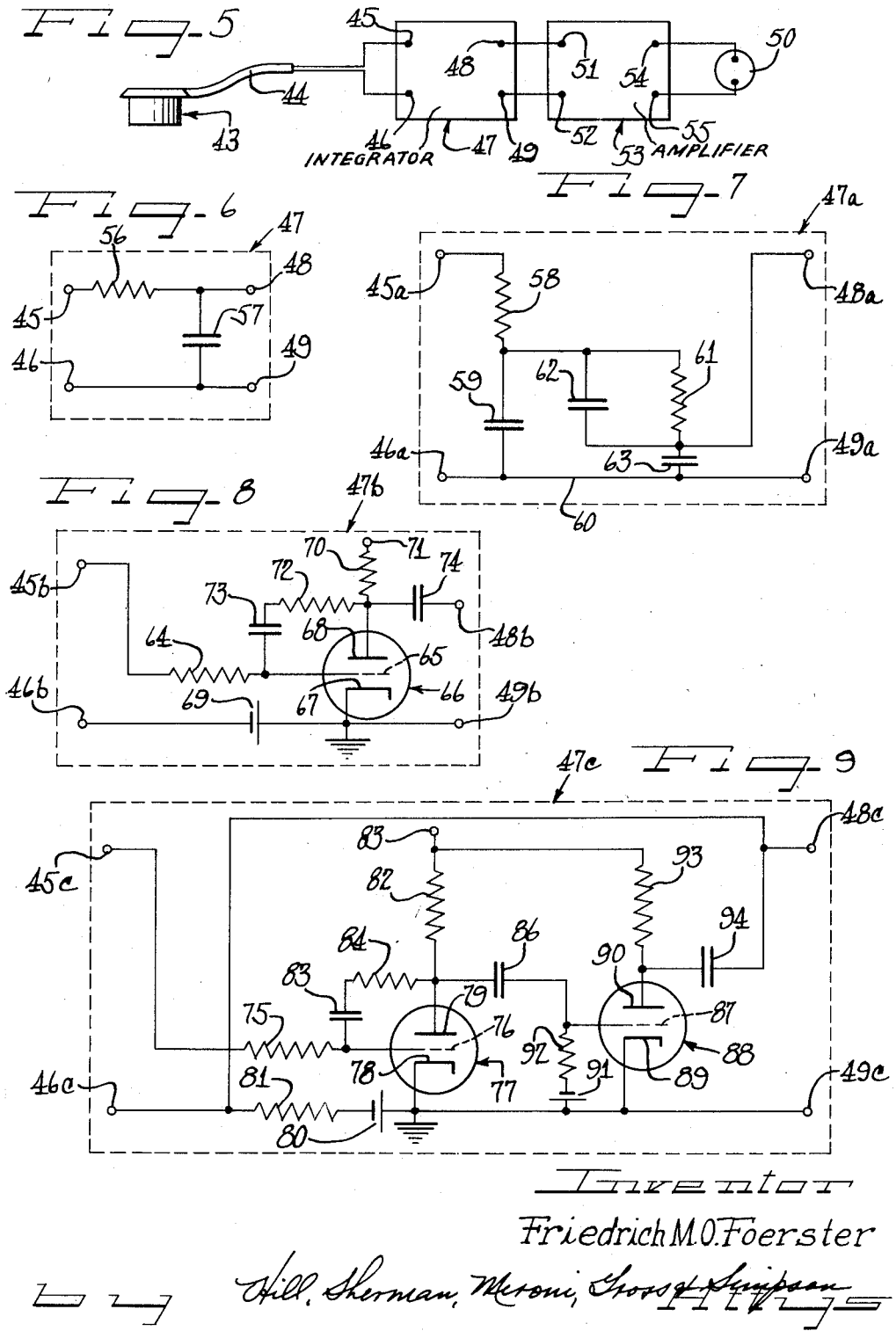

July 5, 1960  F. M. O. FOERSTER  2,944,213
APPARATUS FOR NON-DESTRUCTIVE TESTING
Filed Nov. 15, 1954  4 Sheets-Sheet 3

Inventor
Friedrich M.O. Foerster

July 5, 1960 F. M. O. FOERSTER 2,944,213
APPARATUS FOR NON-DESTRUCTIVE TESTING
Filed Nov. 15, 1954 4 Sheets-Sheet 4
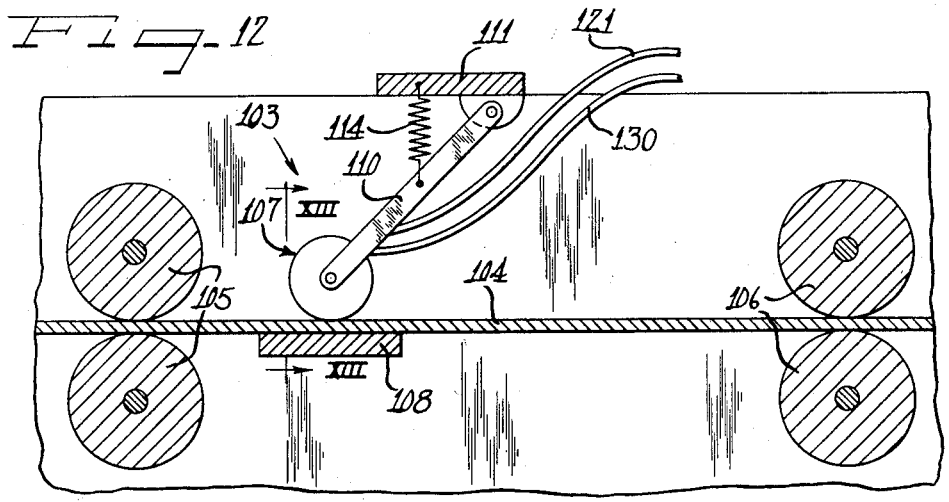
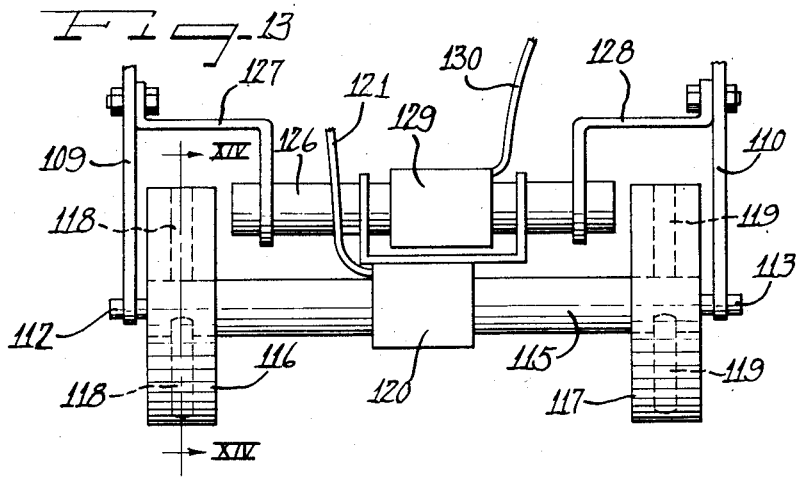
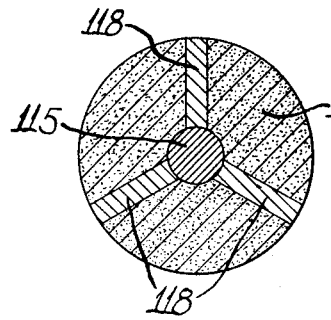
Inventor
Friedrich M. O. Foerster

United States Patent Office 2,944,213
Patented July 5, 1960

2,944,213

APPARATUS FOR NON-DESTRUCTIVE TESTING

Friedrich M. O. Foerster, Panoramestr. 107, Reutlingen, Germany

Filed Nov. 15, 1954, Ser. No. 468,964

6 Claims. (Cl. 324—34)

This invention relates to a method and apparatus for non-destructive testing and more particularly to a method and apparatus for determining the dimensions or magnetic properties of a specimen structure from the effect of such structure on the field of a permanent magnet.

According to this invention, a permanent magnet is moved relative to a specimen structure having magnetic properties from an initial position in which the flux path between the poles of the magnet is not affected by the specimen structure to a test position in which the flux path is affected by the specimen structure.

The decrease in reluctance and the corresponding increase in flux in the magnet are affected by the magnetic properties of the magnetic material in the specimen structure and the dimensions of the structure, including the spacing between the magnetic material of the structure and the poles of the magnet. If all but one of the variables are known, the unknown variable can be determined from the increase in the flux in the magnet.

For example, the specimen structure may be a sheet of magnetizable material of unknown thickness but of known magnetic properties and the magnet may be moved from an initial position in which the flux path between poles is essentially a non-magnetic medium such as air to a test position in which the poles contact one side of the sheet, or are at a known spacing therefrom. Assuming that the width and length of the sheet are known, or are large enough so that variations therein do not have any substantial effect on the reluctance, the thickness of the sheet can be determined directly from the increased flux in the magnet. As another example, the specimen structure may be a member of known dimensions but of unknown magnetic properties, and such properties can be determined from the increase in flux in the permanent magnet when moved from a position away from the structure to a test position adjacent the structure. Thus the invention may be used to measure the carbon content of steel or the content of ores.

As a third example, the specimen structure may be a sheet of material of known thickness and of known magnetic properties coated with a layer of non-magnetic material of unknown thickness and the permanent magnet may be moved from a position away from the sheet to a position in which the poles of the magnet contact the layer, or are at a known spacing with respect thereto. The thickness of the layer may in this case be determined from the increase in flux in the magnet.

According to a specific feature of the invention, the increase in flux in the magnet may be determined by winding a coil around a portion of the magnet and determining the voltage induced in the coil by the change in the flux when the magnet is moved relative to the specimen structure from an initial position to a tested position. A further feature is in the means for responding to the voltage induced in the coil to give an indication of the change in the flux which is independent of any other factor.

The invention may be applied to two different types of measurements. In one type, the characteristic of a particular specimen structure is determined in a single operation. In the other type, the testing operation is continuous. Certain problems are encountered with each type of measurement, which are overcome by this invention.

When the magnet is moved from its initial position in which the specimen structure does not affect the flux path between the poles of the magnet to the test position in which the magnetic material of the specimen is in the path of flux between the magnet poles, the instantaneous induced voltage in the coil will be equal to the instantaneous rate of change of flux with respect to time. In equation form, $$e = -\frac{\partial B}{\partial t} qn 10^{-8} \text{ volts}$$

where $q$ is the effective cross section of the winding in square centimeters, $n$ is the number of turns in the coil and $e$ is the induced voltage. The induced voltage can also be given by the following formula:

$$e = -\frac{\partial B}{\partial v} \cdot \frac{dv}{dt} qn 10^{-8} \text{ volts}$$

This equation clearly indicates the dependence of the induced voltage on the speed of movement of the magnet with respect to the specimen structure.

In the type of operation wherein individual specimens are tested, it is desirable that the magnet be manually moved from the initial position to the test position, and it would clearly be undesirable to have the indication dependent upon the speed of movement of the magnet. According to an important feature of this invention, means are provided for minimizing the dependence on the speed of movement of the magnet.

If the instantaneous voltage multiplied by a differential in time is integrated from zero to infinity, it will be found that the result will be independent of the velocity. Expressed in equation form, $$\int_0^\infty e\, dt = -\Delta B [qn 10^{-8}] \text{ volts}$$

Thus, if the voltage induced in the coil is integrated, the result will be directly proportional to the change in flux, or flux density, and independent of the velocity of movement.

By this invention, accordingly, means are provided for developing a signal or indication to the integral of the voltage induced in the magnet coil. The integration can be accomplished either by directly coupling the induced voltage to a ballistic galvanometer or by indirectly coupling the induced voltage through an integrating network to a suitable measurement indicator, for example, a rotating coil instrument. Such integrating networks may be in the form of a simple RC network, a multiple stage RC network, either with or without a following amplifier, or electronically operating integrators.

In most applications, it will be desirable that the instrument indication be retained for a substantial length of time, so that it can be readily and accurately observed. For this reason, and because the inertia of the rotating system of the ordinary ballistic galvanometer is substantial, the ordinary ballistic galvanometer is not very suitable and, according to a specific feature of the invention, a special galvanometer is provided having a restoring force substantially equal to zero and a rotating system of negligible inertia with respect to the rotating force. This may be more clearly understood by considering the general differential equation for the rotating force in a galvanometer, as follows:

$$K\frac{d^2\varphi}{dt^2} + P\frac{d\varphi}{dt} + D\varphi = f$$

Where K is the moment of inertia, D is the restoring force, $\varphi$ is the deflection angle, and P is the dampening constant. If the restoring force is substantially equal to zero and if the moment of inertia is negligible with respect to the dampening constant, then only the middle term will be effective and the deflection will be equal to the integral of the applied force. The applied force is, of course, proportional to current which is equal to the induced voltage divided by the resistance in the galvanometer circuit, assuming that the resistance outweighs by far any possible self-inductions, which can be readily attained. Consequently, the deflection will be proportional to the change in flux or flux density caused by movement of the magnet from its initial position to the test position.

When the magnet is then moved from the test position back to the initial position, the moving or rotating system of the galvanometer will be restored to its initial position since an equal integrated induced voltage will be developed with opposite sign. Accordingly, a series of individual measurements can be performed without resetting the galvanometer to zero. However, due to many factors, it is possible that the rotating system of the galvanometer might be dsiplaced from its calibrated setting, and preferably, means are provided for driving the rotating system of the galvanometer back to its zero position. Such means comprise a battery, photocell or the like.

As above indicated, the resistance of the galvanometer circuit should be high in comparison to any self-induction in the circuit, in order that the deflection be proportional to the integral of the voltage induced in the magnet coil. It is therefore desirable to prevent extremely rapid changes in the induced voltage, as might be encountered with correspondingly rapid movement of the magnet to or from its test position. According to a further feature of the invention, such a rapid change in the induced voltage may be prevented by providing a shorted turn, or turns, about the magnet. A current will flow in such a turn to develop a counter-flux opposing rapid changes in the flux in the magnet. Of course, such a turn may absorb a certain amount of energy, but as long as it is always active, it will not affect the accuracy of the measurement.

According to a specific feature of the invention, the magnet may be of pot form and the shorted turn may be in the form of a solid ring of conductive material such as copper surrounding the core of the magnet, which ring may serve to seal the coil within the magnet and also serve to provide a smooth surface to the portion of the magnet which is engaged with the specimen.

It may be noted that in the case wherein the induced voltage in the magnet coil is applied to an integrating circuit, the shorted turn performs a very useful and advantageous function in preventing overloading caused by voltage peaks that are to sharp.

In the measurement of dimensions, such as in the measurement of sheet thickness, it is desirable that the indication be independent of the magnetic qualities of the specimen structure during measurement. According to another feature of the invention, this result is attained by making the flux in the permanent magnet large enough to obtain approximate saturation in the specimen. A specific feature is in the dimensioning of the magnet relative to its remanent induction and the saturation induction and thickness of the specimen, to obtain this result.

In another preferred form of the invention, continuous measurement of the magnetic properties or dimensions of a specimen structure may be achieved. In this form, a permanent magnet is moved relative to the specimen structure automatically from an initial position in which the specimen structure is out of the flux path between the magnet poles to a test position in which the specimen structure is in the flux path between magnet poles. This will induce a voltage of alternating polarity in the magnet coil which may be integrated to remove the dependency on speed and then rectified to obtain a signal whose peak-heights are a function only of the change in flux or flux density when the magnet is moved between the initial and test positions.

This continuous measurement system is particularly advantageous when the specimen structure is in continuous motion as, for example, when the specimen structure is a traveling sheet of material whose thickness it is desired to measure. A further feature of the invention is in the provision of means operated by traveling stock or the like for effecting relative movement of the magnet and the stock. A preferred arrangement will be described in detail hereinafter.

Still further features of the invention reside in particular types of magnet constructions by which certain types of specimen structures can be tested and in particular test procedures for various types of measurements.

An important advantage of the invention is that for single or individual measurements, the apparatus can be built without any current source and for continuous measurements, no direct current excitation of the magnetic system is necessary so that no complicated regulated supplies and the like are required. Another advantage is that the magnets, through which no excitation currents are flowing, are exceptionally sturdy and wear-resistant and only forceful mechanical destruction will render them useless. Another advantage is that all measurements can be taken from one side of a test specimen.

An object of this invention, accordingly, is to provide improved methods and apparatus for determining the dimensions or magnetic properties of a specimen structure from the effect of such structure on the field of a permanent magnet.

Another object of this invention is to provide improved methods and apparatus for determining the dimensions or magnetic properties of a specimen structure in which an indication is obtained independent of the speed of movement of a test device relative to the specimen structure.

A further object of this invention is to provide improved methods and apparatus for measuring the dimensions or magnetic properties of a specimen structure in which no current source is required for the test operation.

Still another object of this invention is to provide improved methods and apparatus in which the magnetic properties or dimensions of a specimen structure can be determined accurately with such structure in motion.

A still further object of this invention is to provide improved methods and apparatus for measuring the magnetic properties or dimensions of a specimen structure in which the measurements can be taken from one side of the structure.

Yet another object of this invention is to provide improved apparatus for measuring the dimensions or magnetic properties of a specimen structure which is efficient, reliable and accurate in operation and yet extremely durable and sturdy.

This invention contemplates other and more specific objects, features and advantages which will become more fully apparent from the following detailed description taken in conjunction with the accompanying drawings which illustrate preferred embodiments and in which:

Figure 1 is a perspective view of one preferred form of testing apparatus constructed in accordance with the principles of this invention;

Figure 2 is a circuit diagram of the apparatus of Figure 1;

Figure 3 is a sectional view of a probe used in the apparatus of Figure 1, taken substantially along line III—III of Figure 1;

Figure 4 is a graph illustrating the variations in magnet flux during testing operations;

Figure 5 is a diagrammatic illustration of another preferred form of the invention, in which the integrating means is in the form of a four terminal network;

Figures 6, 7, 8 and 9 are circuit diagrams of various forms of integrating networks useable in the system of Figure 5;

Figure 12 is a sectional view through a sheet-driving mechanism incorporating another preferred from of test apparatus constructed according to the principles of this invention.

Figure 13 is an elevational view of a portion of the apparatus of Figure 12, looking from line XIII—XIII of Figure 12;

Figure 14 is a sectional view taken substantially along line XIV—XIV of Figure 13;

Figure 10:
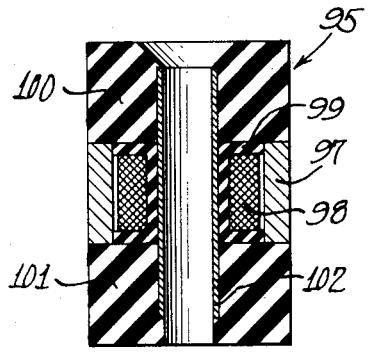
Figure 10 is a sectional view through a modified probe or test head useable with the systems of either Figure 1 or Figure 5.
Figure 11:
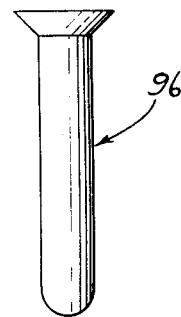
Figure 11 is a view illustrating a cylindrical test specimen, such as a smelting, which the head of Figure 10 may be used to test.

Reference numeral 10 generally designates a preferred form of measuring instrument constructed according to the principles of this invention. The measuring instrument 10 may be used to determine the magnetic properties or dimensions of a specimen structure, and may, for example, be used to measure the thickness of a specimen structure in the form of a sheet 11 of known magnetic properties. For this purpose, a probe 12 is connected through a cord or cable 13 to an indicator 14 which may include a galvanometer 15 mounted in a suitable casing 16.

In operation, the probe 12 is moved from a position away from the sheet 11 to a position, as shown, against one face of the sheet 11, and a pointer or indicator 17 of the galvanometer 15 will be rotated from a zero position through an angle corresponding to the thickness of the sheet 11.

As shown in Figure 3, the probe 12 comprises a permanent magnet which may preferably be of pot form and may comprise an outer annular member 18, a center leg or core 19 coaxially disposed within the member 18 and an annular end plate 20 connecting one end of the core 19 with one end of the annular member 18. A protective cap 21 is secured against such ends of the member 18 and core 19 and the plate 20 as by means of a screw 22 threaded into such one end of the core 19.

A coil 23 is wound about the core 19 within the annular member 18, the coil 23 being preferably wound on an annular form 24 of insulating material having end flanges.

The coil 23 on its form 24 may be held in place by an annular ring 25 disposed about the core 19 and having an annular flange 26 arranged to engage in a groove in an inwardly projecting annular flange portion 27 of the outer member 18. The outer face of the ring 25 is preferably flush with the ends of the member 18 and core 19 which engage the structure to be tested, so that in addition to holding the coil 23 in place, the ring 25 insures a smooth surface for engagement with the specimen structure to be tested.

The ring 25 may also serve a further and very important function in preventing extremely rapid changes in the magnet flux. For this purpose, the ring 25 is of conductive material, such as copper, and it defines a shorted turn to develop a counter-flux opposing rapid changes in the flux in the magnet.

It should be noted that the member 18, the core 19 and the plate 20 are all of magnetic material and any one or all of such members may be permanently magnetized, either before or after assembly. The poles of the magnet are, of course, defined by the ends of the core 19 and the member 18 which are engageable with the specimen structure 11.

Referring now to Figure 4, line 28 may represent a second quadrant portion of the major hysteresis curve of the permanent magnet of the probe 12, the hysteresis curve being a plot of the flux or flux density (represented by the symbol B) versus the magnetizing force (represented by the symbol H). When the specimen structure 11 is away from the magnet 12, as indicated in dotted lines in Figure 3, so that the flux path between poles of the magnet is not affected by the structure 11, the point of operation may be at a point 29 on the hysteresis curve 28. When the magnet is moved into engagement with the specimen structure 11, as indicated in full lines in Figure 3, the point of operation may move along a reversible magnetization line 30 to a point 31, the distance between the points 29 and 31 being determined by the thickness of the sheet 11. This will result in a certain change in the flux density as represented by reference numeral 32 in Figure 4. By measuring this change in flux density, the thickness of the sheet 11 may be indicated.

Since the probe 12 is moved manually in the testing operation, it is important that the indication be independent of the speed of movement, and dependent only on the change in flux. As previously described, such a result is achieved by this invention by obtaining an indication proportional to the integral of the voltage induced in the probe coil 23.

This integration may be performed directly by the galvanometer 15 which, as shown in the circuit diagram of Figure 2, may be coupled through the cord or cable 13 to the probe coil 23.

The galvanometer 15 may be an ordinary ballistic galvanometer. Preferably, however, the galvanometer 15 is a special galvanometer having a restoring force substantially equal to zero and a rotating system of negligible inertia with respect to the rotating force. As previously indicated, this will insure that the deflection of the indicator 17 will be equal to the integral of the applied force, and by making sure that the resistance of the circuit outweighs by far any possible self-induction in the galvanometer circuit, the deflection will be proportional to the change in flux or flux density caused by movement of the magnet from the initial position to the test position.

The restoring force of the galvanometer 15 may be made equal to zero by eliminating any springs or the like acting on its movable coil rotating system, and to eliminate any possible gravity unbalance, the indicator 14 may be operated in a horizontal position with the axis of the movable coil system of the galvanometer 15 in a vertical position. The rotating force may be made large relative to the inertia of the rotating system of the galvanometer by proper design of the galvanometer and by proper matching of the galvanometer coil to the probe, as will be appreciated by those skilled in the art.

The galvanometer 15 may have a scale 33 which may be calibrated in terms of distance, when the instrument is used for the measurement of sheet thickness or the like. For calibration purposes, provision is made for adjusting the resistance in shunt with the galvanometer 15. In particular, a rheostat 34 is connected in parallel with a resistor 35 and in series with a resistor 36 across the galvanometer 15. The rheostat 34 may have a maximum resistance of two ohms and the resistors 35 and 36 may each have a resistance of ten ohms.

In normal operation, when the probe 12 is moved from its test position back to its initial posiion in which the specimen structure is out of the flux path between magnet poles, the indicator 17 of the galvanometer 15 will be returned to its zero position since the flux change will be equal to the flux change that initially caused movement of the indicator 17, but of opposite polarity. However, it is possible that after a long series of measurements, or if the probe 12 is moved too fast, the indicator 17 will not return to its zero position. For such circumstances, provision is made for returning the indicator 17 to its zero position. In particular, a cell 37, such as an ordinary flash light cell or a photo cell, may be connected in series with a push button switch 38 and a resistor 39 across the galvanometer 15. The resistor 39, may, for example, have a resistance of 10,000 ohms.

It may be noted that the casing 16 of the instrument 15 may be provided with a suitable recess 40 into which the probe 12 may be inserted during periods of non-use, and the casing 16 may also be provided with suitable guides 41 and 42 around which the probe cord 13 may be wound.

According to a specific feature of the invention, the instrument 10 when used for measurement of dimensions, such as the measurement of sheet thickness, will give an indication independent of the magnetic qualities of the specimen structure during measurement, by making the flux of the permanent magnet large enough to obtain approximate saturation in the specimen structure. With the form of magnet illustrated in Figure 3, this result will be obtained by making the square of the core diameter multiplied by the remanent induction in the magnet greater than four times the internal diameter of the flange portion 27 of the member 18 multiplied by the thickness and the saturation induction of the specimen structure.

Another preferred arrangement is shown in Figure 5 in which a probe 43, which may be identical to the probe 12 above described, may be connected through a cord 44 to input terminals 45 and 46 of an integrating network 47 having output terminals 48 and 49. The terminals 48 and 49 may be connected directly to a meter 50 or may be connected to input terminals 51 and 52 of an amplifier 53 having outlet terminals 54 and 55 connected to the meter 50. The meter 50 may, in this arrangement, be an ordinary moving coil instrument.

As shown in Figure 6, the integrating network 47 may comprise a simple RC circuit with a resistor 56 connected between the terminals 45 and 48 and with a capacitor 57 connected between the terminals 48 and 49. This circuit should, of course, have a relatively long time constant.

In Figure 7, reference numeral 47a designates another preferred form of integrating circuit which may have input terminals 45a and 46a and output terminals 48a and 49a corresponding to the terminals 45, 46, 48 and 49 of the network 47. In the circuit 47a, the terminal 45a may be connected through a resistor 58 and a capacitor 59 to a line 60 connected between the terminals 46a and 49a, and the junction between the resistor 58 and capacitor 59 may be connected through the parallel combination of a resistor 61 and a capacitor 62 to the terminal 48a, with the terminal 48a connected through a capacitor 63 to the line 60. As will be appreciated by those skilled in the art, an accurate integrating action may be performed by this circuit, with the resistor 61 and capacitors 62 and 63 acting to compensate for inaccuracies that might be produced from the resistor 58 and capacitor 59 alone.

In Figure 8, reference numeral 47b designates an electronic integrating network which may be used in place of the network 47 in the arrangement of Figure 5. The network 47b may have input terminals 45b and 46b and output terminals 48b and 49b corresponding to the terminals 45, 46, 48 and 49 of the network 47. The terminal 45b may be connected through a resistor 64 to the grid 65 of a triode vacuum tube 66 or the like having a cathode 67 and a plate or anode 68. The cathode 67 may be connected to ground and through a grid-bias cell 69 to the terminal 46b and the plate 68 may be connected through a resistor 70 to a terminal 71 at the relatively high positive potential with respect to ground. The plate 68 may also be connected through the series combination of a resistor 72 and a capacitor 73 to the grid 65 and through a capacitor 74 to the output terminal 48b.

As will be appreciated by those skilled in the art, the network 47b will produce an accurate integrating action, and since the tube 66 serves to amplify the input signal, a separate amplifier such as the amplifier 53 may not be necessary.

In Figure 9, reference numeral 47c designates another form of electronic integrating network which may comprise input terminals 45c and 46c and output terminals 48c and 49c corresponding to the terminals 45, 46, 48 and 49 of the network 47. In this circuit, the terminal 45c may be connected through a resistor 75 to the grid 76 of a triode vacuum tube 77 having a cathode 78 and a plate 79. The cathode 78 may be connected to ground and also through a grid bias cell 80 and a series resistor 81 to the terminal 46c. The plate 79 may be connected through a resistor 82 to a terminal 83 arranged to be connected to a source of relatively high potential with respect to ground. The plate 79 may also be connected through a resistor 84 and a capacitor 85 to the grid 76 and through a capacitor 86 to the grid 87 of a second triode vacuum tube having a cathode 89 and a plate 90. The cathode 89 may be connected to ground and through a bias cell 91 and resistor 92 to the grid 87. The plate 90 may be connected through a resistor 93 to the terminal 83 and through a capacitor 94 to the output terminal 48c. To provide a compensating action, the terminal 48c may be connected to the input terminal 46c to develop a feed back voltage across the resistor 81. It will be appreciated that with this circuit, an accurate integrating action will be achieved and due to the amplifying action of the tubes 77 and 88, a separate amplifier may not be required, and the terminals 48c and 49c may be connected directly to a meter.

In Figure 10, reference numeral 95 generally designates a modified form of probe or testing head for use in measuring the magnetic properties or dimensions of a smelting 96 or objects of similar shape. The head 95 comprises a permanently magnetized cylinder 97 which surrounds a coil 98 wound on a suitable form 99. The cylinder 97 together with the coil 98 are disposed between cylinders 100 and 101 having outside diameters equal to the outside diameter of the cylinder 97 and having internal diameters equal to the internal diameter of the coil form 99. The cylinders are held in assembly by means of a pipe 102 having a press fit therewith. The pipe 102 is of non-magnetic material and is preferably of a conductive material such as brass so that in addition to holding the parts in assembly, it serves to provide a shorted turn preventing rapid changes in the magnet flux.

In operation, the coil 98 may be connected to a galvanometer as in the arrangement of Figures 1 and 2, or to integrating circuits such as described above in connection with Figures 5–9. A standard test piece may then be inserted within the head 95 to obtain a reference reading, and the readings obtained with test pieces of unknown qualities may be compared with this reference reading.

In Figure 12, reference numeral 103 designates another preferred form of measurement apparatus, designed for attaining a continuous indication of the magnetic properties or dimensions of a specimen structure. The apparatus 103 is illustrated as it is applied to the measurement of the thickness of a sheet 104 which may be continously driven by pairs of pinch rollers 105 and 106 in a rolling machine or the like.

The apparatus 103 comprises a rotatable test head 107 arranged for rolling engagement with the upper surface of the sheet 104, the sheet 104 being preferably, but not necessarily, supported beneath the test head 107 by a suitable plate 108.

To support the rotatable test head 107, a pair of arms 109 and 110 are pivotally supported from a bar 111 for movement about a common axis and the test head 107 has stub shaft portions 112 and 113 journaled in suitable bearing apertures in end portions of the arms 109 and 110. The test head 107 may be urged by gravity into pressure engagement with the sheet 104, and to minimize the pressure, a tension spring 114 may act on the arm 110 to urge the test head 107 upwardly.

The test head 107 may comprise a cylindrical core 115 on which a pair of wheel discs 116 and 117 are mounted to form a spool-shaped body. The core 115 is of a magnetic material and the discs 116 and 117 are of non-magnetic material but have spoke-like inserts of magnetic material. For example, the disc 116 may have three inserts 118 as illustrated in Figure 14, and the disc 117 may have three similar inserts 119 registering with the inserts 118. As the head 107 rotates, each pair of aligned inserts 118, 119 will move periodically into and out of engagement with the sheet 104.

The core 115, or the inserts 118, 119, or both, may be permanently magnetized so that as the head 107 rotates to periodically engage each pair of inserts with the sheet 104, the flux in the core 115 will periodically increase and decrease, with the difference between the maximum flux and the minimum flux being dependent upon the magnetic properties or thickness of the sheet 104. If the magnetic properties of the sheet 104 are constant, the differential flux will be dependent only on the thickness.

A coil 120 is disposed on the core 115 and from the changing flux, a voltage will be induced in the coil 120 dependent upon the difference between the maximum and the minimum flux and the speed with which the change is accomplished. The coil 120 may be connected through a cord 121 to an integrating circuit 122 which may be of a form as described above in connection with Figures 5–9 and which will remove the dependence on speed.

The output of the integrating network 122 will be a voltage of alternating polarity having a peak amplitude dependent only on the thickness of the sheet 104. This output may be applied directly to a suitable A.C. meter, or it may be coupled to a rectifier 123, either half-wave or full-wave, the output of the rectifier 123 being applied either directly to a meter 124 or indirectly through an amplifier 125. It may be noted that the relative positions of the integrating network 122, the rectifier 123 and the amplifier 125 may be changed without affecting the fundamental operation of the apparatus. For example, the signal from the coil 120 may be amplified, then rectified and then integrated.

In accordance with a specific feature of the invention, the voltage applied to the meter 124 from the coil 120 may be compared with a reference signal to indicate deviation of the thickness of the sheet 104 from a desired thickness.

For this purpose, a member 126 of magnetic material is supported by brackets 127 and 128 from the arms 109 and 110 in a position between the wheel discs 116 and 117 eccentric to the axis of rotation of the head 107. The coil 129 is wound on the member 126 and as the head 107 rotates, a voltage will be induced in the coil 129 of alternating polarity from the changing flux. The coil 129 is coupled through a cord 130 to an integrator network 131 which may be coupled through a rectifier 132 to an amplifier 133 having output terminals 134 and 135. Across the terminals 134 and 135 a voltage will be developed of the same frequency as the voltage developed at the output of the amplifier 125 but of amplitude independent of the thickness of the sheet 104. The selected portion of this voltage is connected by means of a potentiometer 136 in series with the output of the amplifier 125.

In operation, the potentiometer 136 may be adjusted to obtain a null reading at the meter 124 with a sheet of the desired thickness engaged by the head 107. With variations in the thickness of the sheet 104 engaged by the head 107, a reading will be obtained at the meter 124 indicating the direction and degree of deviation of the thickness of the sheet under test from the desired thickness.

Figure 16:
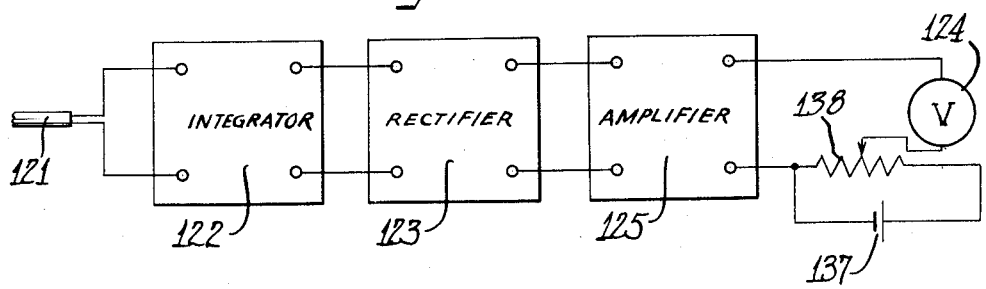
Figure 16 is a schematic diagram of a modified form of electrical apparatus useable with the apparatus of Figure 12.

An alternative arrangement is illustrated in Figure 16 in which a battery 137 and an adjustable potentiometer 138 connected thereacross provide an adjustable reference voltage connected in series between the output of the amplifier 125 and the meter 124. The potentiometer 138 can be adjusted until a null reading is obtained at the meter 124 with sheets of the desired thickness, and the meter 124 will then indicate the direction and degree of deviation of the sheet under test from the desired thickness.

Figure 15:
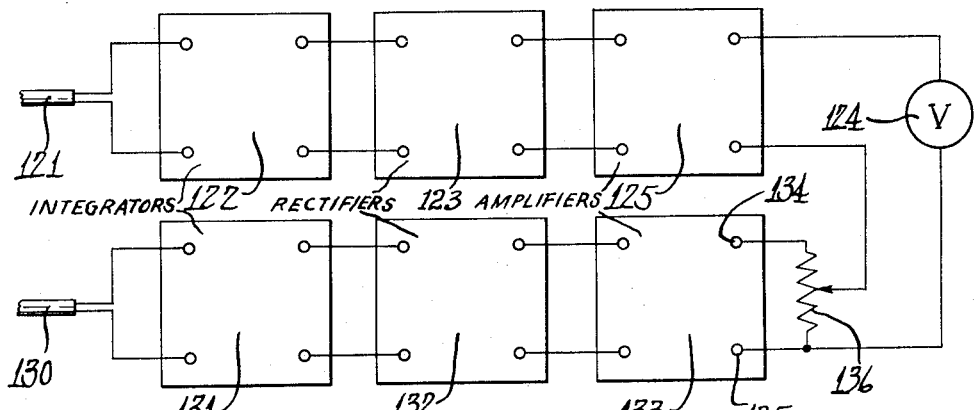
Figure 15 is a schematic diagram of electrical apparatus useable with the test apparatus of Figure 12.

The arrangement of Figure 16, of course, has the advantage that it is extremely simple and uses a minimum number of parts. The arrangement of Figure 15, however, has the advantage in that the integrating networks 122 and 131, the rectifiers 123 and 132, and the amplifiers 125 and 133 may be of like construction and any errors inherently produced by such circuits will be balanced out since the outputs of the amplifiers 125 and 133 are in opposed relation.

It will, of course, be apparent that any desired means might be used for moving the magnet relative to the specimen structure automatically to obtain a continuous reading. The arrangement of Figures 12–14 is, of course, particularly advantageous because the head 107 is driven from the sheet 104 and no separate operating means is required.

It should be noted that the magnetization force of the permanent magnets discussed above is preferably applied internally from residual magnetization but where a large magnetization force is desired, a direct current may be passed through coil surrounding the magnet, and the term permanent magnet is therefore used in a sense to include a magnet in which the magnetizing force is externally applied.

It will be understood that modifications and variations may be effected without departing from the spirit and scope of the novel concepts of this invention.

I claim as my invention:

1. Apparatus for measuring the magnetic properties or dimensions of a specimen structure, comprising: a magnet movable between an initial position in which the flux path between poles thereof is not affected by the specimen structure and a test position in which the flux path is affected by the specimen structure, a coil on said magnet, and a ballistic galvanometer connected to said coil and having a restoring force substantially equal to zero.

2. Apparatus for measuring the magnetic properties or dimensions of a specimen structure comprising: a magnet movable between an initial position in which the flux path between poles thereof is not affected by the specimen structure and a test specimen in which the flux path is affected by the specimen structure, a coil on said magnet, and a ballistic galvanometer connected to said coil having a restoring force substantially equal to zero and a rotating system of negligible inertia with respect to the rotating force afforded by the magnet.

3. Apparatus for measuring the magnetic properties or dimensions of a specimen structure comprising: a magnet movable between an initial position in which the flux path between poles thereof is not affected by the specimen structure and a test specimen in which the flux path is affected by the specimen structure, a coil on said magnet, and a galvanometer connected to said coil, the galvanometer being characterized by a restoring force substantially equal to zero, a rotating system of negligible inertia with respect to the rotating force afforded by the magnet and a resistance in the circuit thereof which is high relative to any self-induced E.M.F. in the galvanometer.

4. Apparatus for measuring the magnetic properties or dimensions of a specimen structure, comprising: a magnet movable between an initial position in which the flux path between the poles thereof is not affected by the specimen structure and a test specimen in which the flux path is affected by the specimen structure, a coil on said magnet, and a galvanometer connected to said coil, the galvanometer having a rheostat connected in parallel with a resistor and in series with a second resistor, across the galvanometer.

5. Apparatus for measuring the magnetic properties or dimensions of a specimen structure, comprising: a magnet movable between an initial position in which the flux path between poles thereof is not affected by the specimen structure and a test position in which the flux path is affected by the specimen structure, a coil on said magnet, and a galvanometer connected to said coil, the galvanometer having a battery connected in series with a push button switch and a resistor across the galvanometer.

6. Apparatus for measuring the magnetic properties or dimensions of a specimen structure comprising: a magnet movable between an initial position and a test position, a coil on said magnet, and a ballistic galvanometer connected to said coil, said galvanometer being actuated entirely by electrical means acting on its movable coil rotating system.

References Cited in the file of this patent

UNITED STATES PATENTS

| | | |
|---|---|---|
| 493,739 | Thomson | Mar. 21, 1893 |
| 2,179,240 | Breitenstein | Nov. 7, 1939 |
| 2,333,976 | Blosjo | Nov. 9, 1943 |
| 2,357,666 | Kuehni | Sept. 5, 1944 |
| 2,381,763 | McCreary | Aug. 7, 1945 |
| 2,571,488 | Rooney | Oct. 16, 1951 |
| 2,644,920 | Tierney | July 7, 1953 |
| 2,676,298 | Frommer | Apr. 20, 1954 |
| 2,691,768 | Janssen | Oct. 12, 1954 |
| 2,703,384 | Rendel | Mar. 1, 1955 |